April 20, 1954 — E. T. WYMAN — 2,675,846
SAFETY TIRE
Filed Jan. 31, 1950 — 2 Sheets-Sheet 2
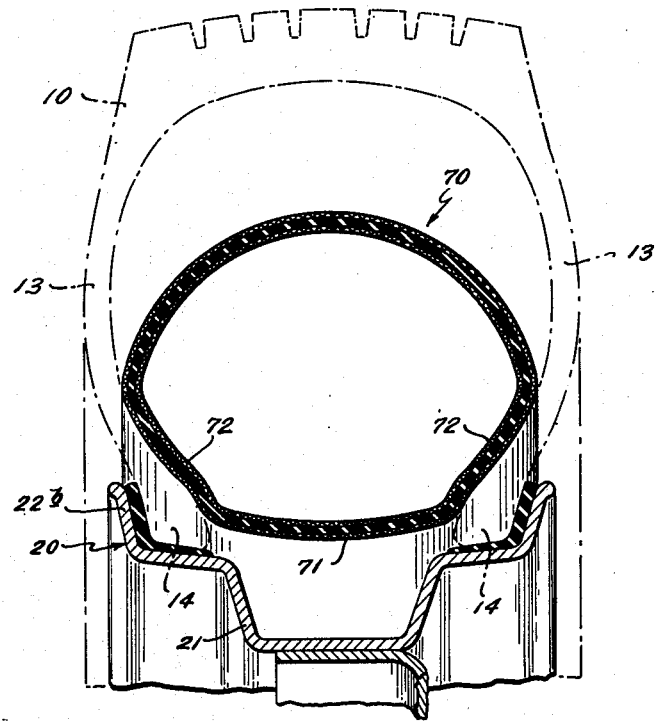
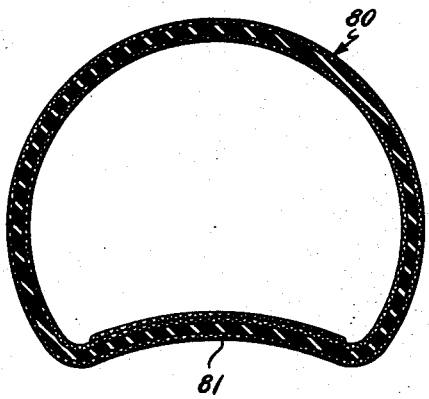
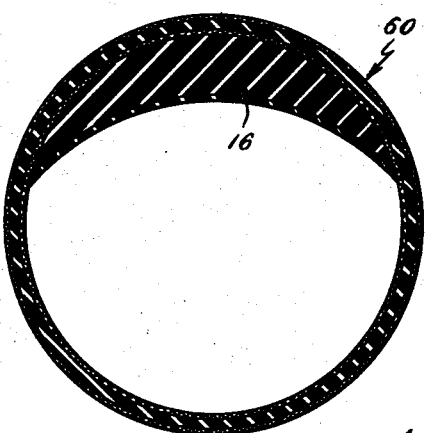
Inventor;
Edwin T. Wyman,
by Dike, Calver + Porter
Att'ys.

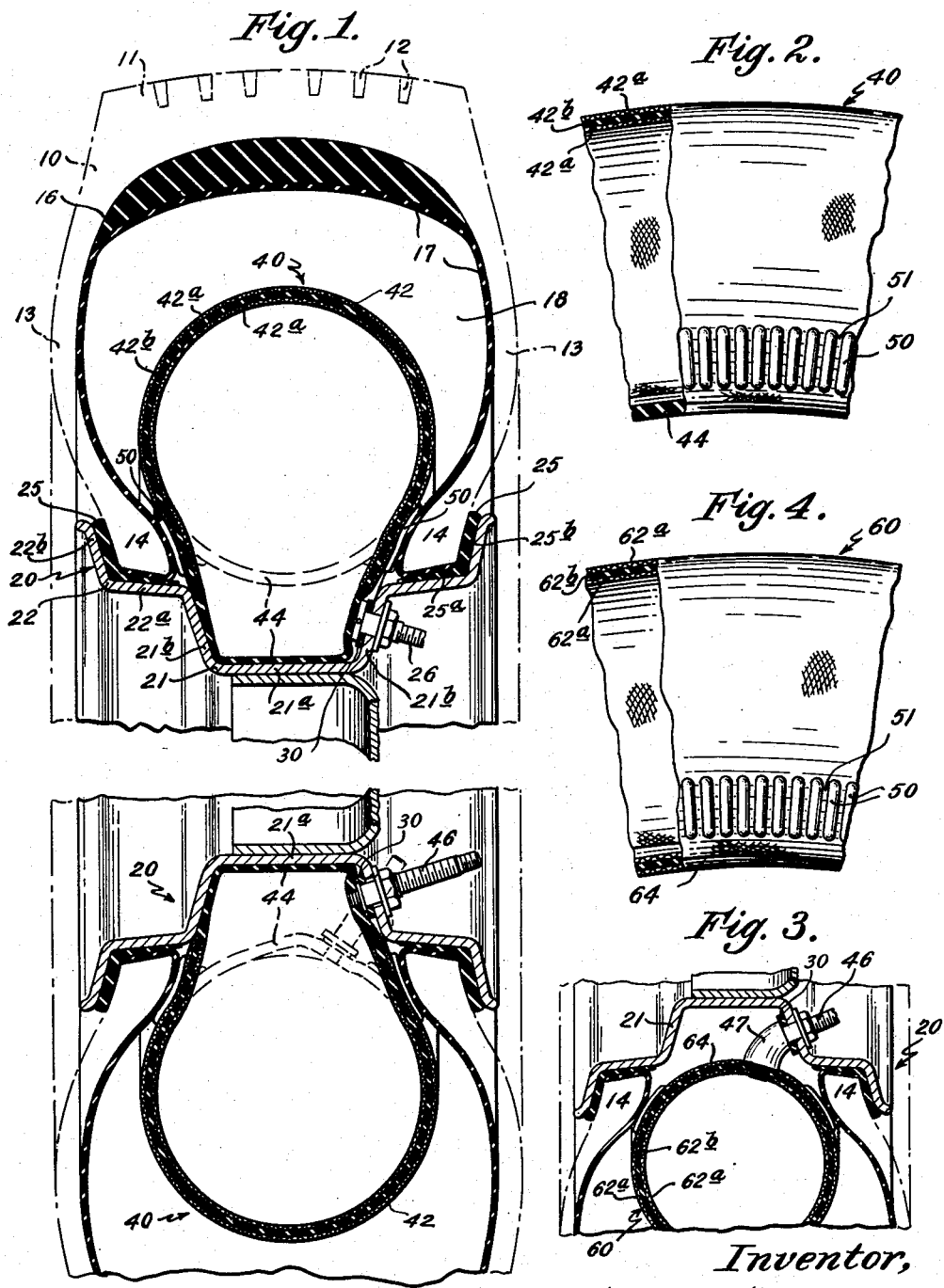

Patented Apr. 20, 1954

2,675,846

UNITED STATES PATENT OFFICE 2,675,846

SAFETY TIRE

Edwin T. Wyman, Brookline, Mass.

Application January 31, 1950, Serial No. 141,501

5 Claims. (Cl. 152—340)

This invention relates to safety tires and has for its object to provide a tubeless tire which includes in the combination the standard tire or casing now commercially available (but eliminating the inner tube now used therein), and which tubeless tire can be mounted on the standard drop-center rims now used on automobiles, and also includes a separate safety tube to support the vehicle in the event that the tubeless tire itself is punctured or otherwise loses its air. This tubeless tire may also be used on other types of rims found on automobiles, buses, trucks, airplanes, motorcycles and bicycles.

Tubeless tires suitable for use on automotive vehicles, airplanes, motorcycles, bicycles and the like have been sought for many years, but the tubeless tires previously developed have not been practical nor successful for many reasons.

I have now succeeded in devising a tubeless tire, which utilizes the standard tire or casing now commercially available, and is capable of being mounted on the standard wheel rims of automobiles, particularly of the drop-center type now in use, and which tubeless tire is fully disclosed and described in the copending application, Serial No. 136,373 filed December 31, 1949. As a modification, and an improvement on such tubeless tire, I have developed a safety tube to be used in conjunction with such tubeless tire and forming a part of the combination thereof. My tubeless safety tire has the great advantage of not requiring special molds, tools and equipment for its manufacture, but which utilizes in large part standard equipment now available. In addition, my tubeless safety tire can be readily assembled and placed on the vehicle by the owner or driver, without the necessity of using special tools or equipment. It will be understood that in my tubeless safety tire, no inner tube, as now in standard use, is used whatever, and that the inner chamber of the tire casing forms the inflated chamber which supports the vehicle. The safety tube, which fills only a portion of the inner chamber of the tire casing, is separately inflated, and supports the vehicle only in the exceptional and emergency situation when the tubeless tire casing itself has lost its air due to puncture, blow-out or other cause. For that reason my tire is preferably termed a tubeless tire, despite the inclusion of the safety tire therein, which, however, is not normally called upon to support the vehicle. However, should a blow-out occur in the tubeless tire casing, the inner tire will not only hold the blown out tire casing on the wheel rim but will support the load of the vehicle indefinitely.

Briefly, my invention includes in combination the standard tire or casing now commercially available and having beaded edges, and designed to be mounted on the standard drop-center rim, or other rims having angular recesses at the sides. With the tire a pair of separate, annular bands of rubber are provided, adapted to be mounted on the rim of the wheel between the beaded edges of the tire and the wheel rim. The two separate annular bands of rubber act as a seal to seal the tire casing against leakage of air, and the air pressure of the tire causes the beaded edges of the tire to fit tightly against the annular bands in the angular recesses of the sides of the rim, and effectively prevents the leakage of air. The bands of rubber may be flat, but preferably taper from the outer edge inwardly, and are soft and flexible enough to readily assume the shape of the angular recess at the sides of the rim when placed in position between the beaded edges of the tire and the rim. Preferably, however, for ease of installation, the annular bands of rubber are molded or preformed in the shape of the annular recess at the sides of the tire into which they are designed to fit, and thus comprise two angularly disposed parts or surfaces extending longitudinally of the bands. Preferably, also, the tire casing is provided on the inside thereof and underneath the tread surface with a thick coating of soft rubber sealing compound of a suitable nature, whereby punctures or holes caused by objects piercing the tread of the tire are readily sealed by the soft plastic compound, to prevent leakage of air through the tread. There is further provided a separate safety tube to be mounted within the tire casing, and substantially smaller in cross-section than the interior chamber of the tire casing. The tire casing and safety tube are separately inflated and are not in air communication with each other. To avoid the use of specially made valves, the casing and safety tube are preferably inflated through separate valves, but it will be understood that a single valve of dual or branching construction may be used to inflate the casing and safety tube separately, or simultaneously.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings:

Fig. 1 is a cross-section of my tubeless tire as mounted on a wheel rim of the drop-center type and showing the two valves for inflating the tire and safety tube separately;

Fig. 2 is a side elevation of a portion of the safety tube shown in Fig. 1 with a portion broken away to show the construction of the safety tube;

Fig. 3 is a cross-section of my tubeless safety tire having a modified form of safety tube;

Fig. 4 is a side elevation of a portion of the modified inner tube shown in Fig. 3 with a part broken away to show more clearly its construction.

Fig. 5 is a cross-section of my tubeless safety tire with a second modified form of safety tube;

Fig. 6 is a cross-section of a third modified form of safety tube; and

Fig. 7 is a modification of a fourth modified form of safety tube.

In the drawings 10 represents a standard rubber tire casing having a tread portion 11 with grooves 12 formed in the tread portion, and having side walls 13 and beaded edges 14. It will be understood that the beaded edge 14 is usually stiffened and strengthened with annular wire strands (not shown) which run around the tire inside the beaded edge 14. A lining or thick coating 16 of a self-sealing compound of any suitable nature is provided on the interior of the tire 10 beneath its tread surface which is designed to seal punctures and holes caused by nails and other objects piercing the thread surface. A rubber lining 17 is preferably provided on the interior of the tire and over the coating 16 to prevent diffusion of air into the walls of the tire and possible separation of the fabric cords therein from the surrounding rubber material.

The standard tire casing 10 thus described is adapted to be mounted on a standard wheel rim 20, which, as shown in the drawings (Figs. 1 and 3), is of the standard "drop-center" type having the drop-center portion 21 comprising the bottom wall 21a and side walls 21b, and angular recesses 22 at the sides thereof consisting of bottom wall 22a and side wall 22b, into which the angular outer surface of the beaded edges 14 of the tire 10 are designed to fit.

A separate pair of annular bands of rubber 25 are provided, preferably having two preformed angularly disposed parts or surfaces 25a and 25b, which bands are designed to fit into the angular recesses 22 at the sides of the rim 20 and between the tire and the rim, and to receive the angular edge of the beads 14 of the tire casing 10 (as shown in Figs. 1 and 3). Part 25b, angularly disposed with respect to part 25a, is in effect a flanged extension of part 25a of the annular rubber band 25. However, as previously stated, the portion 25b, instead of being preformed or mounted at an angle to portion 25a, may be formed as a flat piece extending in the same direction or plane as portion 25a, and which will then assume its angular relation with respect to portion 25a when placed in position between the beaded edge of the tire, and the angular recess at the side of the rim. The portion 25b is preferably tapered toward the inner edge and has a circumference to fit, preferably under slight tension, the portion of the rim 22a (Fig. 1) it contacts, so that the beads 14 will slide easily over it when the tire is inflated. These annular bands 25 are preferably made of soft resilient vulcanized rubber, similar to that of which the standard inner tubes or tires are made. Each annular band 25 is made to fit closely the rim on which it is to be used. The band 25 after being placed on the rim 20 is placed against the recessed angle 22 formed by the side 22a and bottom 22b of the rim 20 by the pressure of the angular outer rim of the beads 14 on inflation of tire 10. The preformed angularly disposed surface construction of the annular band 25, comprising parts 25a and 25b, readily fit into the angular recess 22 at the sides of the rim 20 and more easily cause the band to assume its proper position in the recess 22. This angular construction serves to anchor the annular band in proper position between the tire and rim and tends to prevent it from creeping, or from being pulled outwardly from its position between the tire and the rim.

A tire valve 26 of standard construction is provided, preferably in the outer side wall 21b of the rim 20, through which the tire may be inflated, with suitable rubber washers 30 to prevent leakage of air around the valve 26.

A safety tube 40 of rubber, and fabric entirely separate from tire casing 10 is provided, to be mounted and inserted within the tire casing 10 and closely hugging, when inflated, the drop-center portion 21 of the rim 20. In the safety tube construction shown in Fig. 1, the safety tube 40 comprises the outer wall 42, preferably inextensible in nature and formed of two or more layers of cord or woven fabric 42a and one or more layers of rubber 42b suitably assembled. An inner base wall or belly 44 formed of stretchable material such as sheet rubber is vulcanized to the fabric or cord and rubber portion of the tube 42 at their adjoining edges adjacent the bead engaging zone of the tube 40. As shown in Fig. 1, it will be noted that the bottom wall 44 is expanded on inflation to engage the inner drop-center portion of the rim 20. A separate valve 46 is provided through which safety tube 40 may be inflated, which again is provided with suitable washers 30 to prevent leakage of air around the valve. It will be understood that there is no communication by air between safety tube 40 and the inflated interior chamber 18 of the tire casing 10, and that in the event of deflation of tire casing 10, by puncture, blow-out or otherwise, that the inflated safety tube 40 will provide sufficient support for the vehicle to permit the driver to retain control of his vehicle and eliminate such hazards as skidding and inability to steer properly, which are particularly dangerous if the vehicle is traveling at high speed. The safety tube 40 acts to hold the beads 14 of the deflated tire casing 10 in place in the flanged recesses 22 of the wheel rim 20 and supports the load of the vehicle indefinitely. Means is provided to permit passage of air around the sides of safety tube 40 into the inner chamber 18 of tire casing 10 at the bead engaging portions thereof, which comprises an annular row of spaced ridges 50 with grooves 51 between successive ridges. It will be understood that the ridges 50 engaging the inner sides of the tire casing 10 adjacent the beaded edges 14 will hold the tube 40 spaced therefrom, to permit the passage of air from tire valve 46 into the inner chamber 18 of tire casing 10.

In Fig. 3 a modified form of safety tube 40 is shown in which the safety tube 60 is formed entirely of a non-extensible material such as rubberized cord or fabric, and preferably includes two or more layers of cord 62a and one or more of rubber 62b suitably arranged. With the safety tube 60 the valve 46 is provided with flexible neck 47 extending to the tube 60. An annular row of transversely extending ridges 50 with grooves 51 is similarly provided to permit passage of air around safety tube 60. The modified form of safety tube 60, of course, does not stretch longitudinally on inflation, and hence its belly portion 64 between the bead engaging portions of its outer wall will not be extended into the drop-center 21 of the rim 20, but will press firmly against the inner beads 14 of the tire 10 holding both the tire 10 and the tire beads 14 firmly in place.

In Fig. 5 I have shown a second modified form of safety tube 70, in which the tube is substantially elliptical in shape on a horizontal axis. In addition the lower or belly portion 71 of the tube is made substantially flat and the lower sides 72 of the tube 70 are preferably molded to conform to the shape of the inner surface of the beaded edge 14 of the tire casing 10, but in other respects is substantially like the safety tube 60 shown in Fig. 3. With the elliptical shaped tube 70 one size of tube is able to fit several or many sizes of tire casing 10, and it is unnecessary to have as many sizes of safety tube as it would be with the safety tube 60 of Fig. 3, provided the wheel rim 20 is of the same size. The substantially flat belly portion 71 of the tube has a circumference large enough to slip over the side flange 22b of the wheel rim 20, without using the drop-center 21 of the wheel rim as an aid to installing and removing the tube from the wheel rim.

In Fig. 6 another modification 80 of safety tube is shown wherein the lower or belly portion 81 of the tube is convex in shape in cross-section and curves upwardly toward the center of the tube. The belly portion 81 is preferably stiffened and reinforced with additional layers of cord and rubber to make it less flexible, whereby the air pressure within the tube pressing against the belly portion 81 will cause the latter to flatten out and thus exert greater pressure sidewise against the beaded edges 14 of the tire casing 10. It will be understood, of course, that the stiffened convex belly portion 81 of tube 80 could be added to the tube 70, for instance, if desired. Also in situations where the tire casing 10 is not coated with a lining 16 of self-sealing compound, it is desirable as an additional safety factor to attach such lining or coating 16 of the self-sealing compound to the inside of the safety tube 60 (or 40, 70 or 80) on the interior under the tread portion, as shown in Fig. 7. In this manner a nail or other object which punctures and deflates the tire casing 10 will be prevented from deflating the safety tube.

To mount my tubeless safety tire on a rim and inflate it, the safety tube 40 (or 60, 70 or 80) is first placed inside the tire casing 10 and both are then mounted on the rim with the valve 46 extending through a hole provided in the outer side wall 21b of the rim 20. Then the annular bands 25 are stretched and placed in position in the angular recess 22 of the rim 20. To do this the beaded edges 14 of the tire 10 may be forced toward the drop-center 21 of the rim 20 to allow room to install the annular bands 25. The bands 25 being installed in position on either side of the rim, the safety tube is then inflated with air through the tire valve 46. As the air pressure in the tube increases, the air pressure forces the beaded edges of the tire 10 against the bottom and side walls 22a and 22b of the angular recess 22 of the rim, thus making a perfect air seal. The tire casing 10 is then inflated through its separate valve 26. There being no air communication between safety tube 40 and the inner chamber 18 of tire casing 10, safety tube 40 will at all times provide an auxiliary safety support for the tire 10, in the event of deflation of the latter through puncture, blow-out or other injury. It will be noted that my construction provides a tubeless safety tire for the first time which may be readily mounted and removed by the driver of the vehicle and without the use of special tools or equipment. It will be noted also that my safety tube 40 (or 60, 70 or 80) in the event of deflation of tire casing 10 by puncture, blow-out, or other cause, will still act to hold the beaded edges 14 of the tire casing 10 firmly against the angular sides of the rim 20, and will be capable of supporting the load of the vehicle indefinitely and independently, thus avoiding the constant dangers attending tire blow-outs in single chambered tires at high vehicle speeds.

My invention is not limited to the precise constructions shown herein but may be modified in many details, without departure from the spirit of the invention and within the scope of the claims.

It will of course be understood that the term "rubber" as used herein indicates both natural and synthetic rubber and substances having rubber-like properties and characteristics as full equivalents.

I claim:

1. In combination with a tubeless tire casing and a wheel rim having outwardly extending flanged sides forming recesses to receive the beaded edges of the tubeless tire casing, the interior of said tire casing forming with the interior of said rim an inflatable air chamber, a separate inflatable substantially toroid shaped inner tire, inserted in the tubeless tire casing, said inner tire being smaller when in its inflated condition than the cavity of the tubeless tire, and having transverse ridges providing air vents, and giving free air communication to the air chamber of said tire casing, whereby said inner tire, on inflation, presses firmly against the inner surfaces of the tubesless tire beads and is enabled on deflation of the tubeless tire to carry the load imposed on it indefinitely, and valve means through which air may be supplied to said inner tire and to the air chamber between the external surface of said inner tire and the interior of the tubeless tire casing and tire rim.

2. In combination with a tubeless tire casing and a wheel rim having outwardly extending flanged sides forming recesses to receive the beaded edges of the tubeless tire casing, the interior of said tire casing forming with the interior of said rim an inflatable air chamber, a separate inflatable substantially toroid shaped inner tire, inserted in and removed from the tubeless tire casing, said inner tube being smaller when in its inflated condition than the cavity of the tubeless tire, and having transverse ridges providing air vents around the entire external side surface of the inner tire, and giving free air communication to the air chamber of said tire casing, whereby said inner tire on inflation, presses firmly against the inner surfaces of the tubeless tire beads and is enabled on deflation of the tubeless tire to carry the load imposed on it indefinitely, and valve means through which air may be supplied to said inner tire and to the air chamber between the external surface of said inner tire and the interior of the tubeless tire casing and wheel rim.

3. In combination with a tire casing and a wheel rim of a drop-center type having outwardly extending flanged sides forming recesses to seat the beaded edges of a tire casing, a pair separate annular bands of rubber inserted in said flanged sides of the wheel rim between the beaded edges of the tire casing and the wheel rim, the interior of said tire casing, forming with the interior of the rim an inflatable tire sealed by said annular rubber bands, a valve for inflating said tire, and a separate, inflatable substantially toroid-shaped inner tire inserted in the tire casing and constituting a separate safety tube, said inner tire being smaller when in its inflated condition than the cavity of the tire, and having transverse ridges providing air vents above the air valve supplying air to the tire casing, whereby the lower portions of the sides of the inner tire on inflation will press firmly against the inner surfaces of the tire beads and is enabled on deflation of the tire casing to carry the load imposed upon it indefinitely, and a valve for inflating said inner tire, there being no communication of air between said inner tire and tire casing.

4. In combination with a tire casing and a wheel rim having outwardly extending flanged sides forming recesses to seat the beaded edges of the tire casing, a pair of separate annular bands of rubber inserted in the flanged sides of the wheel rim between the beaded edges of the tire casing and the wheel rim, the interior of the tire casing forming with the interior of the rim, an inflatable tire sealed by said annular rubber bands, a valve for inflating said tire, a separate safety tube mounted on said rim within said tire casing and having transverse ridges on the lower outside thereof providing air vents for supplying air to the air chamber of said tire casing and a valve for inflating said tube.

5. In combination with a tire casing and a wheel rim having outwardly extending flanged sides forming recesses to seat the beaded edges of the tire casing, a pair of separate annular bands of rubber inserted in the flanged sides of the wheel rim between the beaded edges of the tire casing and the wheel rim, the interior of the tire casing forming with the interior of the rim an inflatable tire sealed by said annular rubber bands, a valve for inflating said tire, a separate safety tube mounted on said rim within said tire casing and having transverse ridges on the lower outside thereof providing air vents for supplying air to the air chamber of said tire casing and a valve for inflating said tube, there being no communication of air between said tube and said tire casing.

References Cited in the file of this patent
UNITED STATES PATENTS

| Number | Name | Date |
|---|---|---|
| 1,459,377 | Peeples | June 19, 1923 |
| 1,626,511 | Clark | Apr. 26, 1927 |
| 1,653,054 | Mack | Dec. 20, 1927 |
| 2,169,041 | Gammeter | Aug. 8, 1939 |
| 2,554,815 | Church | May 29, 1951 |
| 2,563,787 | Keefe | Aug. 7, 1951 |